United States Patent [19]

Daniel

[11] 4,343,294

[45] Aug. 10, 1982

[54] SOLAR COLLECTOR ASSEMBLY

[76] Inventor: Jack H. Daniel, 4009 Melinda Dr., Chattanooga, Tenn. 37416

[21] Appl. No.: 88,608

[22] Filed: Oct. 26, 1979

[51] Int. Cl.$^3$ ............................................... F24J 3/02
[52] U.S. Cl. ................................... 126/424; 126/451; 126/438
[58] Field of Search ..................... 126/424, 438, 451; 62/2, 236

[56] References Cited

U.S. PATENT DOCUMENTS

| | | | |
|---|---|---|---|
| 3,960,322 | 6/1976 | Ruff | 62/2 |
| 4,086,072 | 4/1978 | Shaw | 62/2 |
| 4,192,289 | 3/1980 | Clark | 126/438 |
| 4,198,826 | 4/1980 | Chromie | 126/438 |
| 4,218,114 | 8/1980 | Bunch | 126/438 |
| 4,266,530 | 5/1981 | Steadman | 126/438 |

FOREIGN PATENT DOCUMENTS

2511740 9/1976 Fed. Rep. of Germany ...... 126/438

*Primary Examiner*—Albert J. Makay
*Assistant Examiner*—Henry Bennett
*Attorney, Agent, or Firm*—Newton, Hopkins & Ormsby

[57] ABSTRACT

A plurality of individually adjustable flat mirrors on a common bed of a solar collector assembly reflect the sun's rays into a tubular collector where water is converted to steam for selectively either driving a motor of refrigeration system which cools a cool water tank or directly heating a hot water tank. Coils in the cool water tank supply coolant for room heat exchangers. The exhaust of the motor heats the hot water tank and is then recirculated to produce more steam. Coils in the hot water tank preheat tap water for a hot water heater and other coils therein supply heat for the room heat exchanger. The mirrors are in rows and are individually swivelly mounted and the frame of the collector assembly is pivotally mounted to track the sun. The collector assembly pivots about two divergent axes to track the sun and is counter balanced with respect to both axes.

16 Claims, 9 Drawing Figures

SOLAR COLLECTOR ASSEMBLY

BACKGROUND OF THE INVENTION

1. Field of the Invention

This invention relates to solar collectors and is more with an apparatus and method of collecting, storing and distributing solar energy.

2. Description of the Prior Art

In the past numerous devices for collecting and storing solar energy have been devised. Most systems are relatively inefficient or expensive or both.

A search of the prior art revealed the following U.S. patents:

Hammond, U.S. Pat. No. 2,529,154
Haring et al, U.S. Pat. No. 3,155,849
Band, U.S. Pat. No. 3,985,118
Jahn, U.S. Pat. No. 3,998,206
Pauly, U.S. Pat. No. 4,000,733
Alkasat, U.S. Pat. No. 4,007,776
Jardin, U.S. Pat. No. 4,008,709
Blitz, U.S. Pat. No. 4,013,885
Robbins, U.S. Pat. No. 4,027,651
Orrison, U.S. Pat. No. 4,038,972
Arbogast, U.S. Pat. No. 4,056,313
Bollefer, U.S. Pat. No. 4,067,314

Of the above patents, the patent to Blitz discloses small flat mirrors which individually track the sun and a four quadrant photo-cell for the tracking system. The patent to Alkasat discloses the use of hot water and cold water tanks and the patents to Jahn and Orrison show parabolic reflectors. Haring et al. teaches the generation of steam by heating using the sun's rays.

SUMMARY OF THE INVENTION

Briefly described, the present invention includes a base frame carrying, for pivoting about right angular disposed axes, a reflector member having a bed with spaced parallel rods on which are disposed rows of swivelly mounted, individually adjustable, flat mirrors which reflect rays of the sun toward a central common collector of a hot box disposed above the mirrors. An aiming tube controls the tracking of the sun by the collector assembly.

The hot box has a downwardly opening tubular collector with a parabolic or hemispherical upper end, against which the rays of the sun are directed by the mirrors. Heat exchanger water is pumped by a pump through a chamber defined, in part, by the collector and is thereby converted to steam which selectively either heats water in a hot water tank or drives a steam motor to drive a compressor through which refrigerant is passed in a refrigeration cycle for cooling water in a cold water tank. The exhaust from the steam motor passes through a coil in the hot water tank and, thence, to an accumulator tank for the pump.

Tap water, fed through a coil in the hot water tank, feeds preheated water to a hot water heater. Fluid, fed through a coil in the cold water tank to the room heat exchangers, provides for cooling a room. Water, fed through a coil in the hot water tank, supplies heated water to a room heat exchanger.

The advantage of my system over the prior art is that a large number of individual inexpensive mirrors are disposed generally along a common plane and individually adjusted so as to reflect the parallel rays of the sun back toward the collector.

The hot box of my system utilizes substantially all of the energy which it receives because the insulation prevents appreciable loss of heat through convection or conduction and the collector reflects little heat back toward the source. The large surface area of the collector enables a substantial amount of heat to be generated.

The tracking tube which I employ simply uses an on/off photo sensor switch that is readily available. Through the double use of the heated water, i.e., for driving the refrigeration system and for heating the hot water tank, more complete use of the energy is achieved.

Through the use of individual heat exchangers which can be employed in the individual rooms, these rooms can be selectively heated or cooled through using the same system.

Accordingly, it is an object of the present invention to provide an apparatus for collecting solar energy which is inexpensive to manufacture, durable in structure and efficient in operation.

Another object of the present invention is to provide an apparatus for collecting and storing solar energy, the apparatus being readily repairable, easily installed and constructed of conventional readily available parts.

Another object of the present invention is to provide, in a solar collecting system, a means for selectively utilizing the collected heat for cooling or for heating purposes.

Another object of the present invention is to provide a process of collecting, storing and using solar energy, the process being readily adaptable to conventional homes.

Other objects, features and advantages of the present invention will become apparent from the following description when taken in conjunction with the accompanying drawings where in like characters referenced designate corresponding parts throughout the several views.

DESCRIPTION OF THE PREFERRED EMBODIMENT

Figure 1:
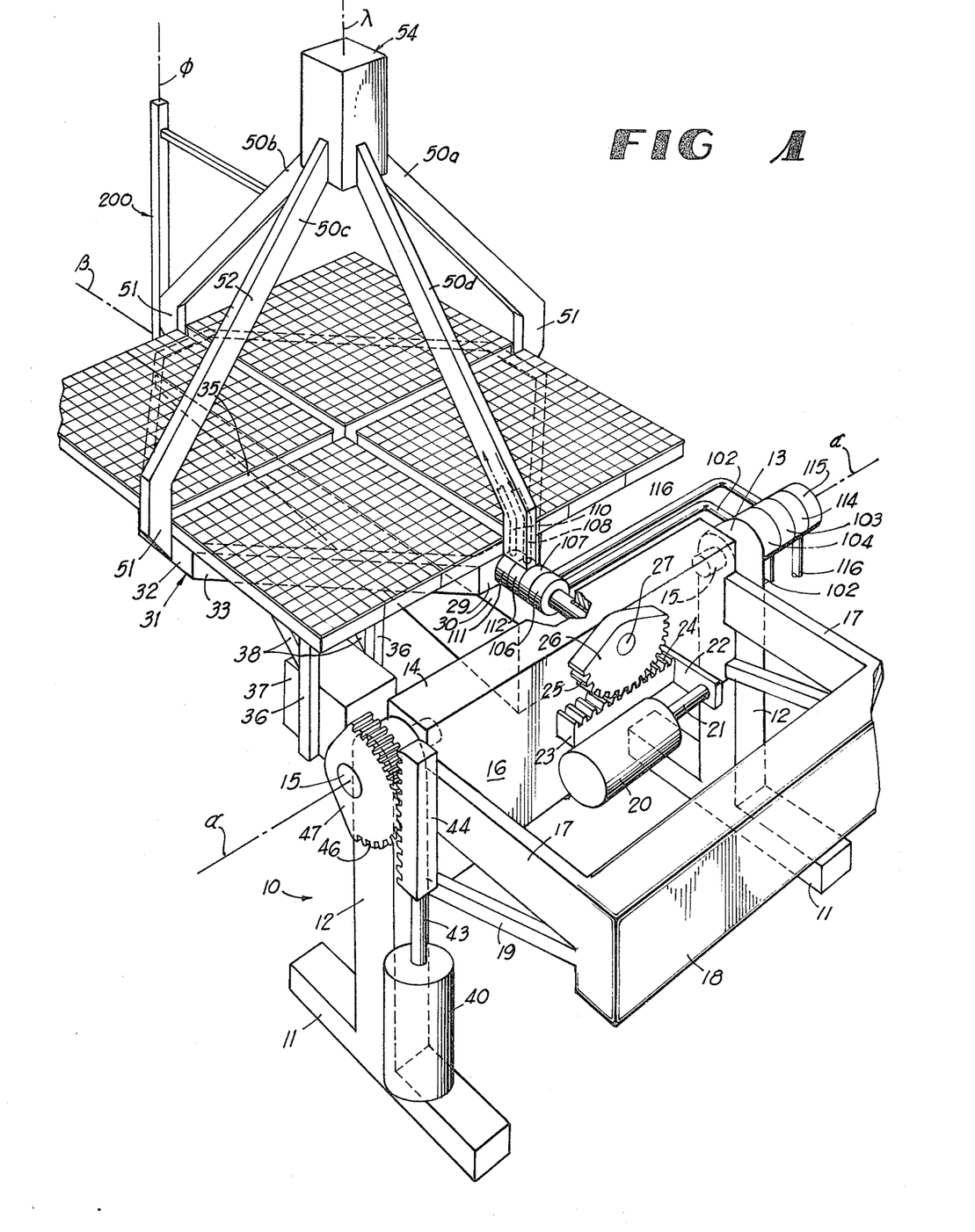
FIG. 1 is a prospective view of the solar collector assembly of the present invention.

Referring now in detail to the embodiment chosen for the purposes of illustrating the present invention, numeral 10 denotes generally the supporting frame for the solar collector assembly. This frame 10 includes a pair of spaced parallel feet 11 which are mounted on a suitable supporting surface, such as the roof of a building. A pair of upstanding, opposed, parallel standards 12 are mounted on the feet 11, the upper ends of these standards 12 being provided with a pair of aligned pillow blocks 13.

Disposed between the pillar blocks 13 is a rectangular cross-bar 14 having, at its opposite ends, trunnions 15 which are journalled by the pillar blocks 13 along a first axis $\alpha$. Depending from the cross-bar 14 is a mounting plate 6 which swings between the upstanding standards 12.

A pair of spaced parallel counterweight supporting struts 17 extend rearwardly from the cross-bar 14 and support at their distal ends a counterweight 18. Reinforcing struts 19 extending angularly upwardly from the mounting plate 16 to the distal ends of the struts 17 provide reinforcement for these struts 17.

On the mounting plate 16 is a double acting, transversely mounted, tilt control, hydraulic cylinder 20, a piston rod 21 of which protrudes parallel to the axis of trunnions 15. The end of the piston rod 21 carries a control bar 22 which protrudes inwardly toward the cross-bar 14. The rack 23 extends from the inner end of the control bar 22 sidewise and parallel to and between the axis $\alpha$ and the piston rod 21. The rack is provided with upstanding teeth 24 which mesh with the peripheral teeth 25 of a pinion 26. The pinion 26 is carried on the end of a longitudinally disposed tilt shaft 27 which extends along a longitudinal axis $\beta$. Axis $\beta$ is perpendicular to the vertical plane including axis $\alpha$.

Protruding forwardly from the central portion of the cross-bar 14 is a pillow block supporting arm 30, the outer or forward portion of which supports a pillow block (not shown) journalling the opposite end of the shaft 27. The arm 30 is thus parallel to and below the shaft 27.

Shaft 27 forms the sole support for the reflector-collector hexagonal frame 31 structure to be discussed hereinafter. Mounted on the shaft 27 is a mirror supporting frame which includes a pair of spaced parallel transversely extending end bars, such as end bar 31, and a pair of spaced parallel longitudinally extending side bars, such as side bar 32. The side bars 32 are opposed members disposed on opposite sides of the shaft 27. The ends of the bars 31 and 32 are joined by diagonally extending struts, such as strut 33. The hexagonal bed frame 31, thus formed, is covered by a flat sheet metal bed or plate 34. The reflector supporting frame 31 carries along its upper surface a flat sheet metal receiving tray, denoted by the numeral 35.

Extending down from the frame 31 are a pair of counterweight supporting arms 36 which are disposed in spaced parallel relationship equal-distant on opposite sides of the central or longitudinal shaft 27. The arms 36 are sufficiently spaced apart that they extend downwardly on opposite sides of the arm 30. A counterweight 37 is carried between the lower end portions of the arms 36. The arms 36 are reinforced by a pair of struts 38 which extend diagonally from the front end bar such as end bar 29, to an intermediate portion of the arms 36.

Returning now to the frame 10, it will be seen that an upstanding double acting transverse tilt control hydraulic cylinder 40 is mounted one of the feet 11, the cylinder 40 having an upstanding piston rod 41, the upper end portion of which is provided with a rack 44 having teeth 45 which mesh with the peripheral teeth 46 of a pinion segment 47, the pinion segment 47 being secured to the end of one of the trunnions 15. Thus, upon actuation of the cylinder 40, the piston rod 43 will move the rack 44 upwardly and downwardly so as to rock the trunnion 15, as desired. This, of course, will tilt the counterbalanced frame 31 about transverse axis $\alpha$.

Returning now to the reflector frame structure, there are provided four circumferentially spaced upstanding, hot box supporting struts, denoted generally by the numerals 50$a$, 50$b$, 50$c$ and 50$d$, each of which is a dog-leg member having upstanding base 51 and an upwardly and inwardly inclined body portion 52. The bases 51 of the supporting struts 50$a$ and 50$c$ are secured to the side bars, such as side bar 32 and the bases 51 of the supporting struts 50$b$ and 50$d$ are secured to the end bars, such as bar 29. Therefore, the bodies 52 of the struts 50$a$, 50$b$, 50$c$ and 50$d$ converge upwardly so that their upper ends terminate at and support a rectangular or right prism hot box, denoted generally by the numeral 54. The construction of this hot box 54 will be described in more detail hereinafter.

Figures 4, 5, 6:
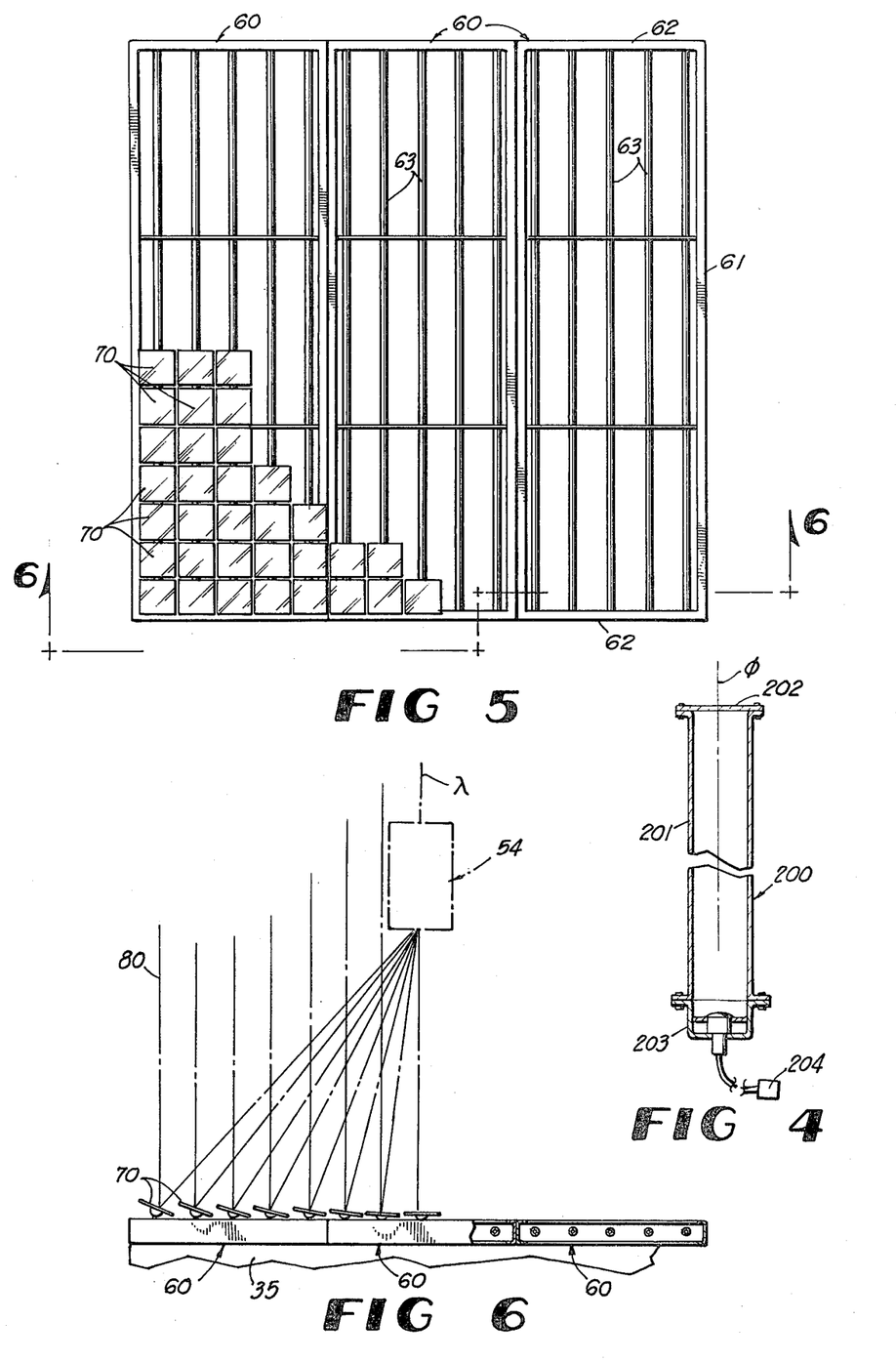
FIG. 4 is a vertical sectional view of a detail showing the tracking tube of the collector assembly disclosed in FIG. 1.
FIG. 5 is a plan view of a partially assembled reflector of the collector assembly disclosed in FIG. 1.
FIG. 6 is a sectional view taken substantially along line 6—6 in FIG. 5.
Figures 7, 8:
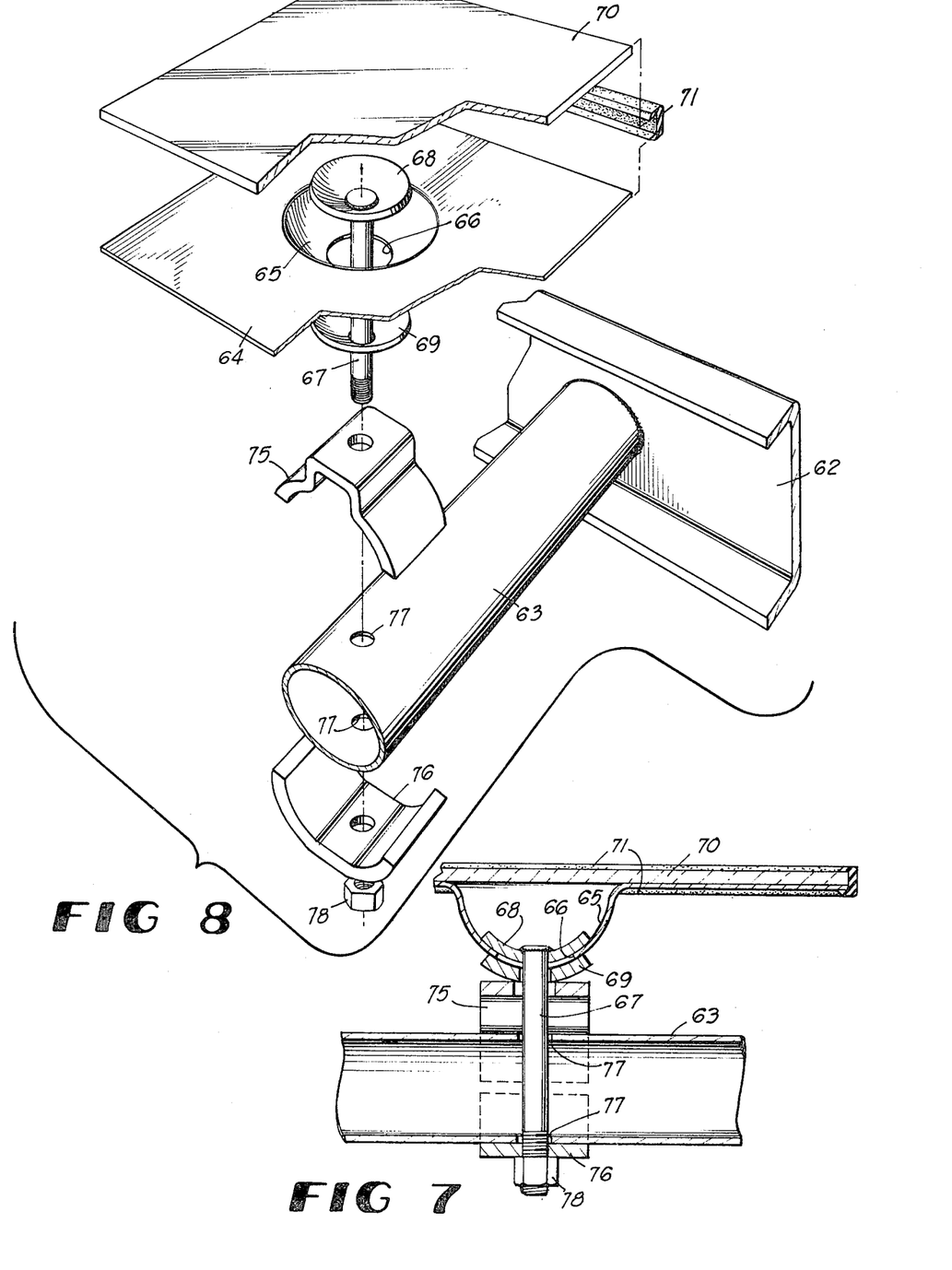
FIG. 7 is an enlarged vertical sectional view showing one of the mirrors and the mounting thereof on a rack of the collector assembly disclosed in FIG. 1.
FIG. 8 is an enlarged exploded fragmentary view of the structure depicted in FIG. 7.

Mounted on the tray 35, are a plurality of open rectangular mirrors supporting racks 60, seen best in FIGS. 6 and 7. Each rack 60 includes a perimetrical frame formed of parallel opposed side beams 61, the ends of which are joined by end beams 62. The beams 61 and 62 are inwardly facing channel members. Disposed between the end beams 62 are a plurality of equally spaced tubular cylindrical mirror support bars 63, each of which carries, along its upper side, a plurality of mirror members which are best seen in FIGS. 7 and 8.

Each mirror member has a mounting means for swivelly mounting a mirror includes a flat square or rectangular mirror supporting plate 64, the central portion of which is deformed downwardly so as to provide a concaved or spherical recess 65 provided with a central hole 66. A bolt 67 protrudes through the hole 66 and is provided with a pair of curvilinear i.e., concaved washers 68 and 69 which sandwich therebetween, the recessed portion 65. The washers 68 and 69 have the same curvature as the recessed portion 65 so as to firmly clamp the recessed portion 65 therebetween, when the bolt 67 is tightened. The hole 66 is substantially larger in diameter than the diameter of the bolt 67 and smaller than the washers, thereby providing a swivel mounting for the plate 64 so that it may be tilted in any position and locked in that position when the bolt 67 is tightened.

Mounted on the upper surface of the plate 64 is a flat rectangular member or mirror 70 which is secured to the plate 64 by a border member 71. The border member 71 is a rectangular frame formed as a channel member of an elastomeric material, such as plastic or rubber and extends around the perimeter of both the plate 64 and the mirror 70. Thus, the plate 64 and the mirror 70 must have the same outside dimensions.

The lower end portion or shank of the bolt 67 protrudes down through a pair of opposed adaptor brackets 75 and 76, on opposite sides of bar 63, the bolt 67 passing through aligned holes 77 in the pipe or bar 63. A nut 78 is received on the end of each bolt 67 and, when tightened, will cause the washers 68 and 69 to clamp and lock the mirror supporting plate 64 in place, as illustrated in FIG. 7.

It will be understood that holes, such as hole 77, are equally spaced along the length of each rod 63 so as to mount a plurality of mirrors 70 in a row along the length of each rod 63. The racks 60 are then mounted in juxtaposition as pictured in FIG. 5 along the surface of the bed or sheet 35 and the racks 60 are secured by fastening means, such as bolts, to this tray 35. It will be understood that the tray 35 is provided with appropriate holes or perforations 79 seen in FIG. 7, so that access can be had from the bottom of the tray 35 to each of the nuts 78. Thus, when installed, there are transverse and longitudinal rows of about 30 mirrors to one bed or sheet 35 each individual mirror 70 being adjustable so as to take the direct rays of the sun, parallel to axis $\gamma$, as depicted by lines 80 and reflect those rays back to the bottom center portion of the hot box 54. Should any of the mirrors become damaged or dull, they may be quite readily and easily replaced by removing the nut 78 of the appropriate mirror assembly and inserting a new mirror assembly therein.

Figures 2, 3:
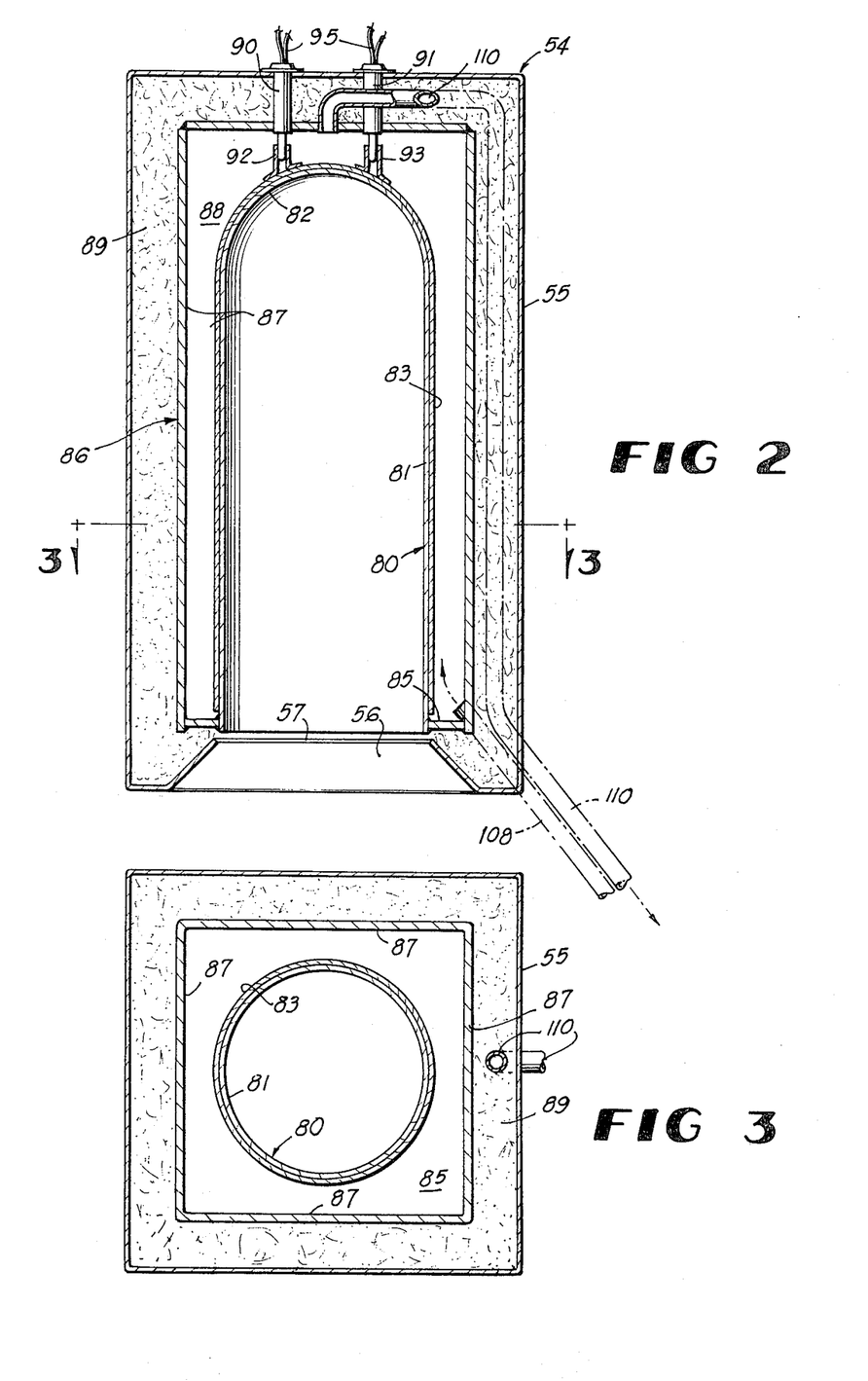
FIG. 2 is an enlarged vertical sectional view of the collector or hot box of the collector assembly disclosed in FIG. 1.
FIG. 3 is a horizontal sectional view taken substantially along line 3—3 in FIG. 2.

Referring now to FIGS. 2 and 3 it will be seen that the hot box 54 includes a right prismatic or box like housing having a sheet metal cover 55 the bottom of which is deformed inwardly to provide a frusto-conical lip 56 with a central opening 57 with its axis along axis $\gamma$. All reflected rays of the sun pass through this opening 57.

Disposed within the interior of the cover 55 is a heat collector 80 which includes a cylindrical body 81, closed at its inner end by a hemispherical concaved cap 82. The outer end of the collector 80 is opened and aligned with the opening or hole 57, the tubular body 81 being of approximately the same or slightly less diameter than the diameter of the opening 57. The interior surface of the tubular body 81 and the cap 82 is coated with a black or dull finish so as to absorb the rays of the sun which are projected by the mirrors 70 through the opening 57. The outer surface of the collector 80 is covered with a copper liner 83. The lower end portion of the collector 80 is mounted in a bottom plate 85 of a right prismatic or box like inner jacket, denoted generally by the numeral 86. This inner jacket 86 is smaller than cover 55 and has sidewalls 87 and an upper wall 88. Thus, the collector 80 and the jacket 86 define a water chamber 88 in which the water fed to the system is heated. Insulation 89 separates the jacket 86 from the cover 55.

Protruding through the cover 55, the insulation 89 and the end 88 are a pair of thermocouples of thermostats 90 and 91, the lower ends of which are received in heat transfer couplings 92 and 93, respectively so that the temperature of the copper liner 83 of collector 80 and cap 82 will be detected. Wires 95 lead from the thermostats 90 and 91 to appropriate circuitry as will be discussed hereinafter.

Figure 9:
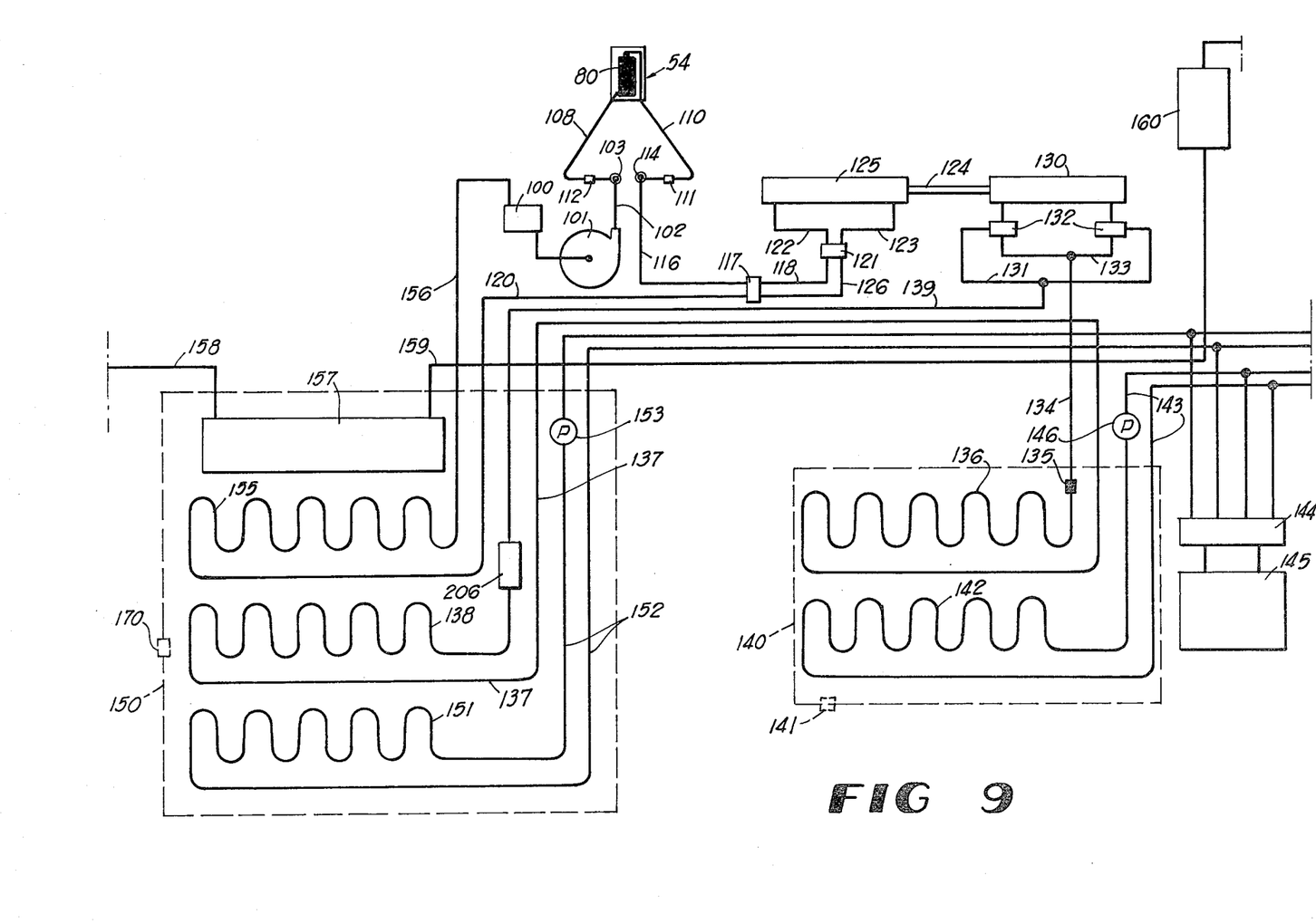
FIG. 9 is a schematic view of the distribution and storage system for the solar energy collected by the collector assembly disclosed in FIG. 1.

Heat exchange fluid such as water to be heated by the collector 80 is fed from an accumulator tank 100, seen in FIG. 9, by means of a pump 101 through a tube 102 and through a pair of rotate fittings 103 and 104 on trunnion 15 on axis $\alpha$ to a water transfer pipe 105 which then feeds through a pair of fittings 106 and 107 on shaft 27 to a water transfer pipe 108. The water transfer pipe 108 feeds up through the strut 50d into the bottom portion of the chamber 88, as seen in FIG. 2. The water thus fills a cavity until it passes either, as steam or as water out through the discharge pipe 110 connected through the end wall 88. The pipe 110 passes through the insulation 88 and then down back through the strut 50d to extend out of the lower end portion of the strut 50d and connect to a pair of couplings 111 and 112 on shaft 27, passing, thence, through pipe 113 to a pair of couplings 114 and 115 on trunnion 15 and thereafter through a pipe or tube 116. Tube 116 leads to a control valve 117, the function of which is to feed the steam or water in the tube 116, selectively, to either a pipe 118 or to a pipe 120. The pipe 118 leads to a piston control valve 121 so that the steam passing through pipe 118 may be alternately delivered to the conduits 122 and 123 for reciprocating the piston rod 124 of a cylinder 125. The return steam is fed to a pipe 126 for delivery to the pipe 120. The reciprocation of the piston rod 124 drives a refrigeration system namely a compressor 130 which is also a double acting cylinder. Liquid refrigerant is taken from a refrigerant line 131 through a pair of check valve assemblies 132 to the respective ends of the cylinder 130 so as to be delivered as a liquid to the high pressure line 133, which feeds, through a refrigerant delivery tube 134 and expansion valve 135 into a refrigeration coil 136 where the refrigerant is converted to a gas and fed through a pipe or tube 137 to a condensing coil 138. Refrigerant from the condensing coil 138 is fed by tubing 139 back to the conduit 131.

The cooling coil 136 is disposed in the top portion of a large cold water tank, denoted by the numeral 140, this cold water tank is preferrably a large concrete tank stored in the basement of or in the ground near a dwelling. Heat exchange brine or other liquid is contained in the tank so that the tank may be cooled to about 25° F., without freezing. A thermostatic probe 141 detects the temperature of the brine Also disposed in the cold water tank, preferably below the cooling coil 136 is a heat exchanger coil 142, the ends of which are connected by pipes 143 to a selector valve 144 and, thence, to a heat exchanger 145. When the valve 144 is appropriately positioned, a small pump 146 in line 143 will deliver heat exchange fluid, such as brine, to the heat exchanger 145 so that the space in which the heat exchanger 145 is located will be cooled. The conduits or pipes 143 also lead to other heat exchangers (not shown).

The condensing coil 138 is disposed in the heat storing liquid i.e., water in a hot water tank 150 which is also disposed in the basement of a dwelling or in the ground adjacent to the dwelling. The condensing coil 138, thus heats the water in this hot water tank 150. Disposed in the hot water tank 150 is a second heat exchanger coil 151 which is connected by pipes 152 to the selector valve 144 so that when the valve 144 is appropriately arranged, the heat exchanger fluid, such as water, will be pumped by a pump 153 to the heat exchanger 145 for heating the space in which the heat exchanger is disposed.

The pipe 120, which receives the exhaust from the motor or cylinder 125, leads to a coil 155, the other end of which is connected through a conduit 156 to the accumulator tank 100 so that water can again be delivered by the pump 101 for being heated by the collector 80. The coil 155 is disposed in the hot water tank 150. Also disposed in the hot water tank 150 is preheater 157, one end of which is connected, by an inlet pipe 158, to a source of tap water. The other end of the preheater 157 is connected through a pipe 159 to a water heater 160. Thus, water which is heated by the water heater 160 is first preheated by the water in the hot water tank 150. A thermostatic probe 170 detects the temperature of the hot water in the hot water tank 150.

Referring back to FIG. 1, and to FIG. 4, it is seen that the axis γ of the collector assembly is to be pointed at the sun, so that the rays of the sun which are parallel to that axis will be reflected back to the collector 80. For this purpose, I have provided a tracking tube, denoted generally by the numeral 200. This tracking tube, as seen in FIG. 6, includes a hollow tubular body 201 having, at its upper end a transparent protective cover 202 and at its lower end a photo sensor 203. This photo sensor or photoelectric cell 203 is connected to a control panel 204 which has appropriate controls (not shown) for actuating the cylinders 20 and 40 to sweep in equally spaced paths until the sun is located.

OPERATION

From the foregoing description, the operation of the present device should be apparent. The collector assembly is particularly adapted to be disassembled and transported to any location and then assembled on the particular site. When so assembled, the axis α should be pointed to true North so that the axis β of the shaft 27 is perpendicular thereto on an east/west axis. The electrical controls 204 are arranged so that they will actuate the cylinders 20 and 40 whereby the cylinder 20 will extend its piston rod 21 and the cylinder 40 will cause the collector assembly to make a sweep from left to right, at which time a limit switch (not shown) will cause the cylinder to return the collector assembly to its easternmost position. By so doing, the cylinder 20 is actuated so as to index through a few degrees, the shaft 27. Thus, an entire sweep of that portion of the heavens containing the sun will be made. When the axis δ is aligned with the sun, the actuation of the two cylinders will cease. Of course, as the sun travels along the eliptic, the cylinder 40 will be periodically actuated, due to the fact that the sun no longer shines down through the tracking tube 200 to shine upon the photoelectric cell 203. A time clock (not shown) shuts down the system at night.

The thermostat of probe 141 is set at 25° so that when the water in the cold water tank 140 has reached this temperature, steam which is fed to the cylinder 125 will be diverted by the valve 117 so as to be directed directly to the hot water tank 150. The thermostat 90 shown in FIG. 2 is for the detection of low temperature and when essentially no heat is being supplied to the collector 80, the thermostat 90 will shut off the pump 101. The second thermostat 91 is a high temperature thermostat which controls the valves 132 and the expansion valve 135 so as to feed coolant or refrigerant to the coil 138 through an expansion valve 206 so as to cool the water in the hot water tank.

It will be obvious to those skilled in the art that many variations may be made in the embodiments here chosen for the purpose of illustrating the invention without departing from the scope thereof as defined by the appended claims.

I claim:

1. In an apparatus for collecting solar energy of the type having a hot box against which the rays of the sun are reflected, the combination therewith of a plurality of flat mirrors spaced from and arranged around an axis extending between said mirrors and said hot box, said mirrors being in a plane generally perpendicular to said axis, a plurality of said mirrors being longitudinally adjacent to each other, a plurality of said mirrors being transversely adjacent to each other and a bed below said mirrors, said bed including means for individually supporting and permitting longitudinal and transverse adjustment of the position of each of said mirrors for assuring that said mirrors respectively individually reflect the rays of the sun toward said hot box, said means including a plurality of rods, a plurality of bolts passing through said rods and extending toward said hot box, swivel elements on the upper ends of said bolts for respectively supporting the lower central portion of each mirror for tiltably mounting the mirrors respectively on their bolts, said swivel elements each including a flat plate supporting each mirror, said plate being provided with a central recessed portion and a hole through the recessed portion, and a pair of curved washers on opposite sides of said hole, said bolt extending through said hole and said washers and having a bolt head within said recessed portion.

2. The apparatus defined in claim 1 wherein said rods are hollow tubular pipes.

3. Apparatus for collecting solar energy comprising:
  (a) a mounting frame;
  (b) a pair of spaced aligned first journal means carried by said frame;
  (c) first pivot means carried by said first journal means for pivoting about a first axis;
  (d) a second pivot means journalled by said second journal means for rotating about a second axis transversely of said first axis; said second pivot means extending laterally in a direction away from said first pivot means;
  (e) control means for respectively incrementally rotating in both directions said first pivot means and said second pivot means;
  (f) a collector assembly frame connected to said second pivot means, said collector assembly frame including:
    (i) a reflector bed disposed along said second axis; and
    (ii) a hot box support secured by its lower end portion to said reflector bed, said support projecting above said reflector bed;
  (g) a collector mounted on the upper end of said hot box support;
  (h) a plurality of individual reflective mirrors for said reflector bed;
  (i) mounting means for adjustably mounting each of said mirrors on said reflector bed for reflecting the sun rays from said mirrors toward said hot box; and
  (j) circulation means for circulating a heat exchange fluid through said hot box for being heated by the reflected rays of the sun.

4. The apparatus for collecting solar energy defined in claim 3 wherein said collector assembly frame is spaced laterally from said first axis so as to pivot without passing through said first axis.

5. The apparatus for collecting solar energy defined in claim 3 including a counterweight disposed laterally on the opposite side of said first axis from said collector assembly frame, said counterweight counterbalancing the weight of said collector assembly frame so that the weights on opposite sides of said first axis are generally balanced.

6. The apparatus for collecting solar energy defined in claim 5 wherein said first axis is below said second axis.

7. The apparatus for collecting solar energy defined in claim 3 wherein each of said mounting means includes a plate for supporting said mirror, said plate having a concaved portion provided with a central opening, a bolt protruding through said opening and received by said bed, and clamping means on said bolt for clamping the concaved portion of said plate when said bolt is tightened.

8. The apparatus for collecting solar energy defined in claim 3 wherein said reflector bed includes a plurality of spaced parallel rods and wherein said mounting means includes a plurality of bolts passing axially through said rods for mounting said mirrors in rows along the upper surface of said bolts.

9. The apparatus for collecting solar energy defined in claim 8 wherein said collector bed includes a plurality of racks surrounding groups of said rods, said bed including a frame and means for removably securing said racks to the frame of said bed.

10. The apparatus for collecting solar energy defined in claim 3 wherein said hot box includes a cover, a tubular collector disposed in said cover, said tubular collector having an open lower end exposed to receive said reflected rays of the sun, means closing the upper end of said tubular collector, said tubular collector and said cover defining, therebetween, a chamber through which said heat exchange fluid is circulated by said circulation means.

11. The apparatus for collecting solar energy defined in claim 3 including power means for pivoting said first pivot means and said second pivot means, said power means being adapted to point the solar collector at the sun during the sun's travel across the sky.

12. The apparatus for collecting solar energy defined in claim 11 including a citing tube mounted on said collector assembly frame, said tube being open at its upper end and a photocensor disposed in the lower end of said tube for sensing when said tube is pointing at the sun and means connected between said photo sensor and said control means for automatically pointing said collector assembly frame at the sun.

13. The apparatus defined in claim 3 wherein in said heat exchange fluid is water and said circulation means includes a steam motor, a hot water tank and means for selectively directing said steam to said steam motor or to said hot water tank, and a refrigeration system driven by said steam motor.

14. The apparatus defined in claim 13 including a cold water tank said refrigeration system being connected to said cold water tank.

15. The apparatus defined in claim 14 including a heat exchanger, coil means connected to said cold water tank, coil means connected to said hot water tank and valve means for selectively connecting the coil means of the cold water tank or the coil means of the hot water tank to said heat exchanger.

16. The apparatus defined in claim 15 including a hot water heater, a preheater for said hot water heater, said preheater being disposed in said hot water tank and conduit means for supplying water from a source of water through said hot water preheater to said hot water heater.

* * * * *